United States Patent
Boodro et al.

(10) Patent No.: US 7,322,030 B1
(45) Date of Patent: Jan. 22, 2008

(54) METHOD AND SYSTEM FOR SOFTWARE PRODUCT GENERATION AND MAINTENANCE

(75) Inventors: Charles J. Boodro, Wellesley, MA (US); Jonathan L. Kaplan, Windham, NH (US); Christopher J. Grey, Cape Elizabeth, ME (US); John R. Stillman, Merrimack, NH (US); Joseph Tringali, Nashua, NH (US)

(73) Assignee: ISO Strategic Solutions, Inc., Nashua, NH (US)

( * ) Notice: Subject to any disclaimer, the term of this patent is extended or adjusted under 35 U.S.C. 154(b) by 639 days.

(21) Appl. No.: 10/457,824

(22) Filed: Jun. 9, 2003

(51) Int. Cl.
    *G06F 9/44* (2006.01)
(52) U.S. Cl. .................................. 717/170
(58) Field of Classification Search ............. 717/170, 717/122, 168, 169; 705/4, 2, 80
    See application file for complete search history.

(56) References Cited

U.S. PATENT DOCUMENTS

| | | | |
|---|---|---|---|
| 4,975,840 A * | 12/1990 | DeTore et al. | 705/4 |
| 5,706,510 A * | 1/1998 | Burgoon | 707/203 |
| 5,950,169 A * | 9/1999 | Borghesi et al. | 705/4 |
| 6,023,578 A * | 2/2000 | Birsan et al. | 717/105 |
| 6,560,620 B1 * | 5/2003 | Ching | 715/511 |
| 7,003,482 B1 * | 2/2006 | Margoscin et al. | 705/35 |
| 2002/0002475 A1 * | 1/2002 | Freedman et al. | 705/4 |
| 2003/0158760 A1 * | 8/2003 | Kannenberg | 705/4 |
| 2004/0103124 A1 * | 5/2004 | Kupkova | 707/203 |

FOREIGN PATENT DOCUMENTS

WO   WO 02/17197 A2 *   2/2002

OTHER PUBLICATIONS

Steven P. Reiss, "Simplifying Data Integration: The Design of the Desert Software Development Environment" May 1996, IEEE Computer Society, ICSE '96, pp. 398-407.*
"Revolutionizing Insurance Technology," Duck Creek Technologies, http://www.duckcreektech.com, downloaded Oct. 14, 2003 (1 p.).
"Company Profile-Duck Creek Technologies," http://www.duckcreektech.com/?id=x90401, downloaded Oct. 14, 2003 (2 pp.).
Duck Creek Technologies, Example Business Model, downloaded Jun. 2001 from http://www.duckcreektech.com, (48 pp.).

* cited by examiner

*Primary Examiner*—Wei Zhen
*Assistant Examiner*—Anna Deng
(74) *Attorney, Agent, or Firm*—McCarter & English LLP

(57) ABSTRACT

Computer method and apparatus maintains multiple versions of software programs. Included are a data store of different portions of each version and a generator coupled to the data store. The data store holds the program portions in a base-exception hierarchy. According to user command, the generator forms the desired program version by selecting a base portion and exception portions from the different levels of the hierarchy.

20 Claims, 8 Drawing Sheets

METHOD AND SYSTEM FOR SOFTWARE PRODUCT GENERATION AND MAINTENANCE

BACKGROUND OF THE INVENTION

Computer programs or generally software is utilized in a variety of ways throughout many industries. In one example, user interactive application programs are employed for accomplishing specific tasks such as word processing, accounting/bookkeeping, email or messaging or the like. In another example, database applications are employed where a common storage of data (i.e., the database) is shared among plural users.

It is becoming common for application programs and database programs/applications to be customized for a specific company (set of end users). For example, in the insurance industry there are many types of insurance (property and casualty, automobile, homeowner, etc.) For each type of insurance, various regulations and statutes (federal and/or state) may apply. Further, individual insurance agencies or companies may impose certain limits or conditions per insurance policy or as a function of the type of insurance. Because of the wide variety of combinations of these factors (insurance type, jurisdiction, specific insurance company), most insurance application software programs (for creating insurance policies or quoting policy rates, for example) are highly customized.

The ability of software writers/programmers to supply leveraged software solutions to the respective industries, such as the insurance industry, is complicated by companies' desires to differentiate themselves within their industry by providing variations to the industry-standard products and/or services offered in the marketplace. This company imposed requirement must be balanced with the need to develop automated processes that provide economies of scale to the development and maintenance of software programs. With respect to insurance software programs, this means that a single change to the base software program may or may not need to be reflected across all states and companies when and where it applies.

To date there is a lack of such economies of scale in the development and maintenance of software programs per a given industry. This is especially true in the insurance industry.

SUMMARY OF THE INVENTION

The present invention overcomes the shortcomings of the prior art. In particular, the present invention provides a cost and time saving method and system for developing and maintaining software programs/products without restriction to industry standards or fixed software programs.

For insurance software, the present invention manages the individual company deviations—particularly their unique data elements, UI (user interface) pages, rate deviations and external data sources such as Motor Vehicle Records (MVR's) within a standard fixed software program offering.

Toward that end, the present invention provides a computer method and apparatus for maintaining a plurality of versions of a software program. The method and apparatus include (a) a data store for storing different portions of each version of the software program and (b) a generator coupled to the data store for producing a desired version of the software program upon user command. The data store uses (stores data in) a base-exception hierarchy such that (i) basic portions that are common to each version are stored at a first level of the hierarchy, and (ii) exception portions that are common to less than all versions are stored at succeeding levels of the hierarchy in order of decreasing commonality.

The generator forms the desired program version by selecting basic portions and exception portions from the different levels of the hierarchy in response to the user command.

In accordance with one aspect of the present invention, the exception portions have effective date indicators and the generator is responsive to the effective date indicators in forming the desired program version.

In a preferred embodiment, the data store uses object oriented programming techniques to represent the basic portions and the exception portions such that inheritance applies across different portions.

In the case of insurance software, the invention method and apparatus generates and maintains software programs for prospecting insurance policies, for different companies, in different lines of business and different states or jurisdictions (e.g., province, county). In that case, the first level of the data store hierarchy corresponds to insurance terms that are acceptable countrywide. Succeeding levels of the hierarchy correspond to insurance terms according to industry standards bureaus, states (province) and/or specific insurance company requirements. Further, for the desired version, the generator outputs rating engine files for use as input to a rating engine. In one embodiment, the rating engine files include rate tables and/or rules files.

In accordance with another aspect of the present invention, for the desired version, the generator outputs (a) a user interface, (b) an application database storing data for the desired version, (c) a rules file, and (d) a mapping file describing structure of the application database. The generator output further includes a program file enabling importing and/or exporting of the desired version over a global network.

The present invention method carries out the functional steps of the invention apparatus mentioned above.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a block diagram of the application database in the program product of FIG. 4a.

DETAILED DESCRIPTION OF THE INVENTION

A description of preferred embodiments of the present invention follows. Embodiments specific to the insurance industry are described for purposes of illustration and not limitation of the present invention.

The insurance products/services offered by Property and Casualty (P & C) carriers are generally similar, thus creating a "quasi-standard" or industry standard. These standards are created within the industry based on organizations or a "Rating Bureau" such as ISO (Insurance Services Office). Moreover, state insurance departments standards include statistical and accounting requirements, input and output forms, MVR's and rating.

The P & C insurance standard is first established at the countrywide level. Insurance companies then choose a rating bureau to follow. It is common for many states to have exceptions to countrywide rules and guidelines, which override the countrywide standards. Insurance companies may also choose to deviate from countrywide rating bureau standards or state standards to differentiate their products/services in the marketplace, or choose to not embrace a particular standards organization or information supplier.

Figure 1:
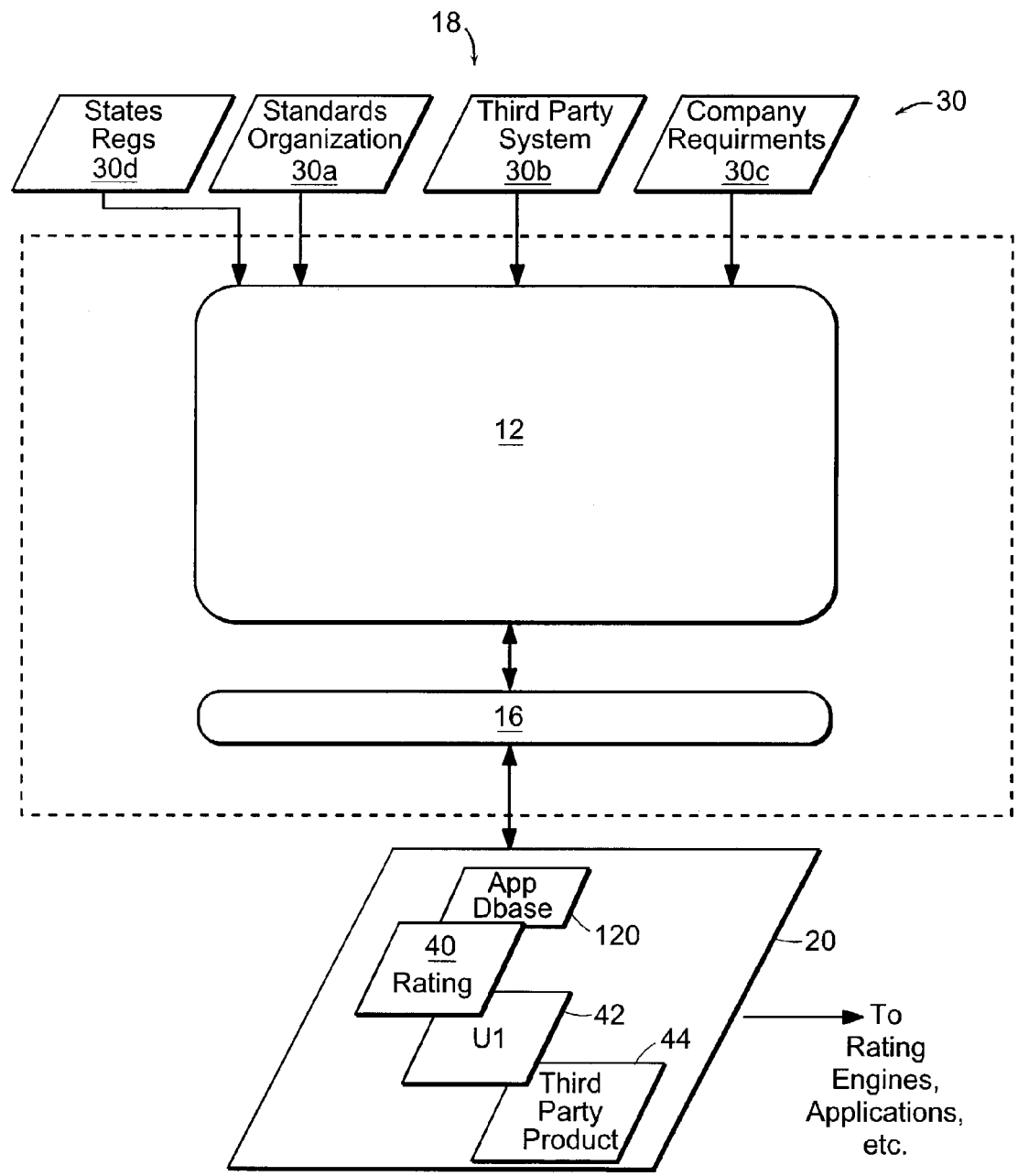
FIG. 1 is a schematic diagram of a preferred embodiment of the present invention.

For each of multiple companies, the present invention enables the creation of a company-specific version of industry software, which in this example is insurance application programs, that is further deployed by an effective date of change. More generally, the present invention provides generation and maintenance of multiple versions of each of different software programs. That is, the present invention enables maintenance of different software programs together with respective versions of the software programs. To accomplish this, the present invention employs a base-exception approach. For a given software program, the present invention provides/stores a basic or base version of the program. For each of different versions of the given software program, the present invention stores different portions that are exceptions to corresponding portions in the base program. In a preferred embodiment, the base and exception portions are stored in a hierarchy that enables efficient retrieval (production) of the desired version of the software program (discussed further below). FIG. 1 is illustrative. Although described in terms of the example insurance policy rating program across different lines of business and types of insurance, it is understood that the present invention is not limited to such application to the insurance industry. Other industries and other applications are contemplated.

FIG. 1 is illustrative of the preferred embodiment which is referred to as the domain management system (DMS) 18. The DMS 18 is effectively a data store of information that represents portions that form the different software programs 20 developed for different companies. This information serves as a source for developing, maintaining and servicing company-specific software programs/products 20.

The DMS 18 houses the following relationships for information provided by external sources 30:

The developed software program's 20 standards related to a standards bureau/organization rule or guideline;

The individual states regulations

The companies adopting the rule or guideline; and

The third party interfaces with the developed software programs 20. The relationship between the interface file layout and the developed software programs 20 are captured within the domain management system 18.

The DMS 18 is formed of a database 12 and a product generator 16. Although database 12 is preferably a relational database, other types of databases (e.g., network database, etc.) are suitable.

External sources 30 provide the data stored in database 12. This includes standard insurance client data (from individual insurance companies 30c or third party systems 30b, e.g., MVR, etc.), general policy information (for example, from standards bureaus 30a), state regulatory specific data (from state regulations 30d) and company-specific data (from individual insurance companies 30c).

Figure 2:
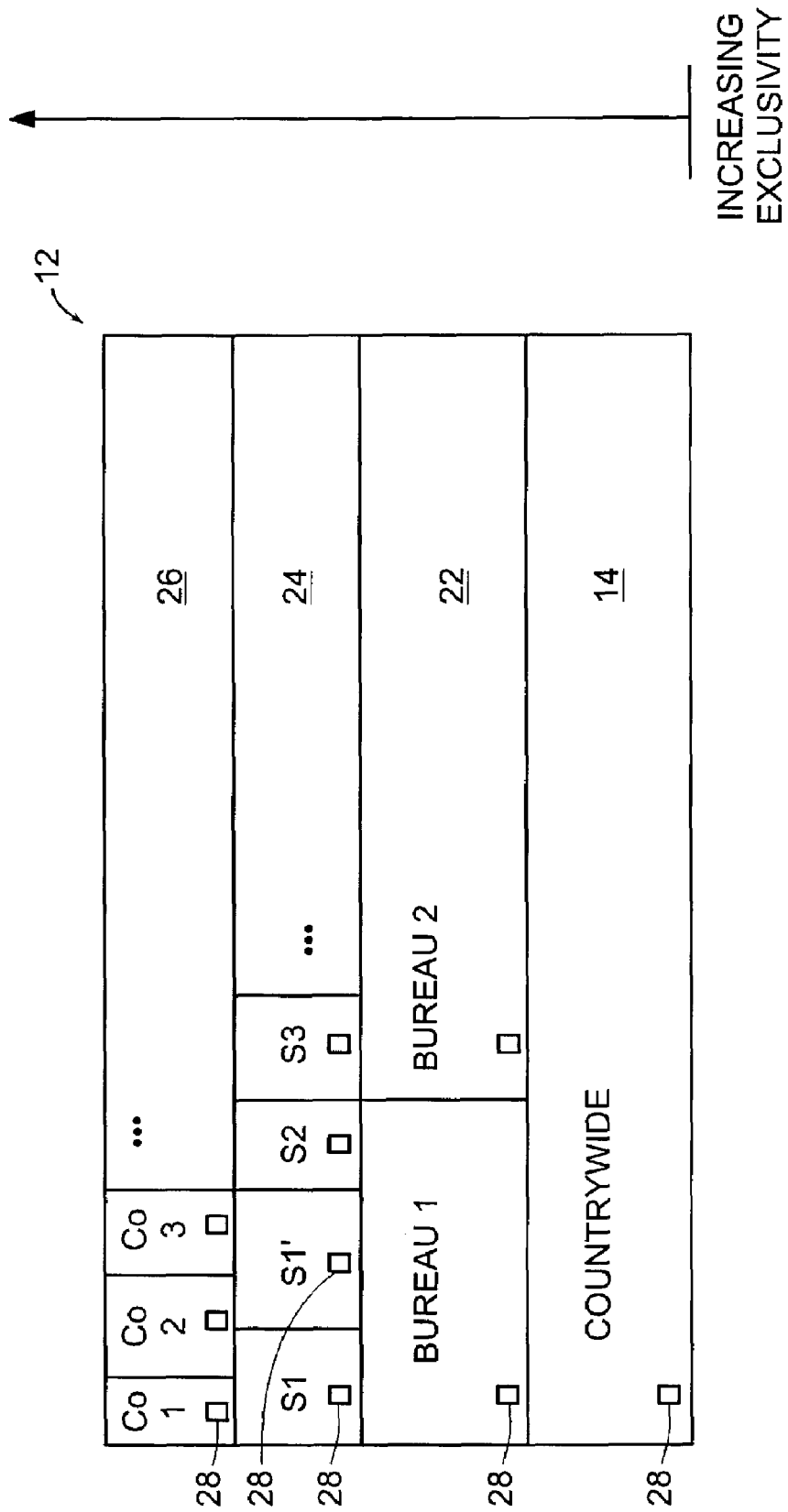
FIG. 2 is a block diagram of the database in the embodiment of FIG. 1.

FIG. 2 illustrates the preferred data organization and structure of database 12. The different levels of data are shown as increasing in exclusivity from the bottom (lowest level) 14 up. Information or data which is relevant and acceptable on a countrywide basis is stored at a first level referred to as the lowest hierarchy level 14. Information at this level 14 includes federal regulations, statutory definitions/limits and the like. This information is stored in the form of a base template or basic program.

At a second or succeeding level 22, database 12 stores industry standards or guidelines according to bureaus or standards organizations (shown as Bureau 1 and Bureau 2). To the extent that a standard or guideline corresponds to (takes precedence over, supplements, replaces or otherwise modifies) a piece of data (regulation, statutory limit, etc.) at the countrywide level 14, the standard or guideline is related to the affected countrywide level 14 data. That is, the records at level 22 of the bureau (Bureau 1 or Bureau 2) issuing that standard/guideline are logically coupled to the affected data at the countrywide level 14.

At a third level 24, database 12 stores indications of state or other jurisdiction exceptions (S1, S2, S3, etc.) to the Bureau 1, Bureau 2 standards or guidelines of level 22. A given state, say S1, may require, for example, stricter standards than a bureau (say Bureau 1) guideline of hierarchy level 22 or the countrywide level 14. Database 12 stores the state data (of level 24) in a manner that provides correspondence or logical coupling to the affected bureau data of level 22. State exceptions S1, S2, S3 . . . include state regulations, statutory limits, thresholds and the like.

In one embodiment of the present invention, data of the countrywide level 14 and the Bureau level 22 are combined. This reduces complexity of the database 12.

It is understood that province, county or other jurisdictional definition may be used instead of state for the level 24 data. As used herein the term "state" is thus meant generically to refer to a geographical or locational jurisdiction (e.g., province, county, etc.), agency jurisdiction or other governing jurisdiction.

At the highest hierarchy level 26, database 12 stores company-specific data according to company (labeled Co1, Co2, . . . Co$_n$ in FIG. 2). The company-specific data may include different limits or thresholds, deductibles, for example.

The company-specific data (Co1, Co2 . . . ) of level 26 overrides or modifies state exceptions (S1, S2, S3 . . . ) of hierarchy level 24, bureau exceptions of hierarchy level 22 and/or countrywide data at hierarchy level 14. Database 12 stores the company-specific data of level 26 in a manner that provides correspondence or logical reference to the affected state level 24 data.

Time stamps 28 indicate effective date and time of a set of data in the various levels 14, 22, 24, 26 of database 12. So a given state may have different exceptions depending on the policy or operative date. S1 and S1' in FIG. 2 are illustrative where different bureau standards (e.g., Bureau 1)

of level 22 are affected depending on the effective date of the state exceptions S1, S1' as indicated by respective S1, S1' time stamps 28. Or, the same bureau standards of Bureau 1 for example may be affected but with different exceptions for the given state at level 24. Thus S1 and S1' are provided for a subject same state but with different dates for applying respective exceptions as indicated by respective time stamps 28.

Likewise company Co2 of level 26 may modify state exceptions of S1 and S1' when respectively applicable to their time stamps 28. Company Co2's data does not affect state level 24 data until the company's effective date/time as indicated by Co2's time stamp 28.

Bureau 1 may have multiple sets of standards with respective effective dates each indicated with a respective time stamp 28. Further, it is understood that standards of a bureau (Bureau 1 for example) may apply to all fifty states during one time period, and at a different time period, standards of a different bureau (Bureau 2) may apply to a subset of the states (S1, S2 . . . ) according to time stamps 28 at the bureau level 22.

Further, the data structure of FIG. 2 is repeated, in the insurance company example, for each line of business and type of insurance. That is, for property and casualty insurance, database 12 stores a hierarchy of data as illustrated in FIG. 2 and described above. For each of homeowners insurance and automobile insurance, database 12 similarly stores a respective hierarchy of data.

Returning to FIG. 1, the product generator 16 is responsive to user command to produce a desired software program 20. In the preferred embodiment, the user command includes (as parameters) indications of line of business, insurance type, industry bureau or standards organization to follow, state/province, subject insurance company and working (operative) date. Location may also be indicated, so that generator 16 selects an appropriate language and currency for use in the user interface content and any reports output.

In response to the user's command, product generator 16 searches database 12. In particular, utilizing the indicated line of business and insurance type, generator 16 generator 16 traverses the obtained hierarchy of data and effectively collects the corresponding data (program portions). The collected data serves as the exception portions to the base portion (or basic workbook program 64 in FIG. 3a) stored at the countrywide level 14. Due to the date time stamps 28 and logical relationships between data across hierarchy levels stored in database 12 (as described in FIG. 2 above), the pertinent (ultimately collected) data lies along a path which is determinable by generator 16 from the user command parameters. That is, starting from the countrywide level 14, the generator 16 follows date time stamps 28 matching the user specified working date and related bureau level 22 data, to corresponding (by date and logical relation) state level 24 data, and finally company-specific data (level 26) of pertinence, according to date/time and logical relation to obtained state level data 24.

The results are the base-exception program portions for forming the desired software program version 20 in response to the user command. The resulting program version portions are as up to date as maintained by database 12. In this way, if there is a change in governmental rules 30d or standards organizations data 30a, or the like, the present invention system 18 enables all affected product programs 20 to be efficiently updated. Similarly, if an insurance company changes its particular requirements (represented at 30c), the present invention system 18 enables each affected product program 20 to be efficiently updated.

The resulting product programs 20 are executable or computer application usable code. In the insurance application example, product programs 20 are so called "published" as a computer generated report and used as input (in the form of electronic spreadsheet workbooks) to rating engines and other software applications discussed later.

Figure 4A:
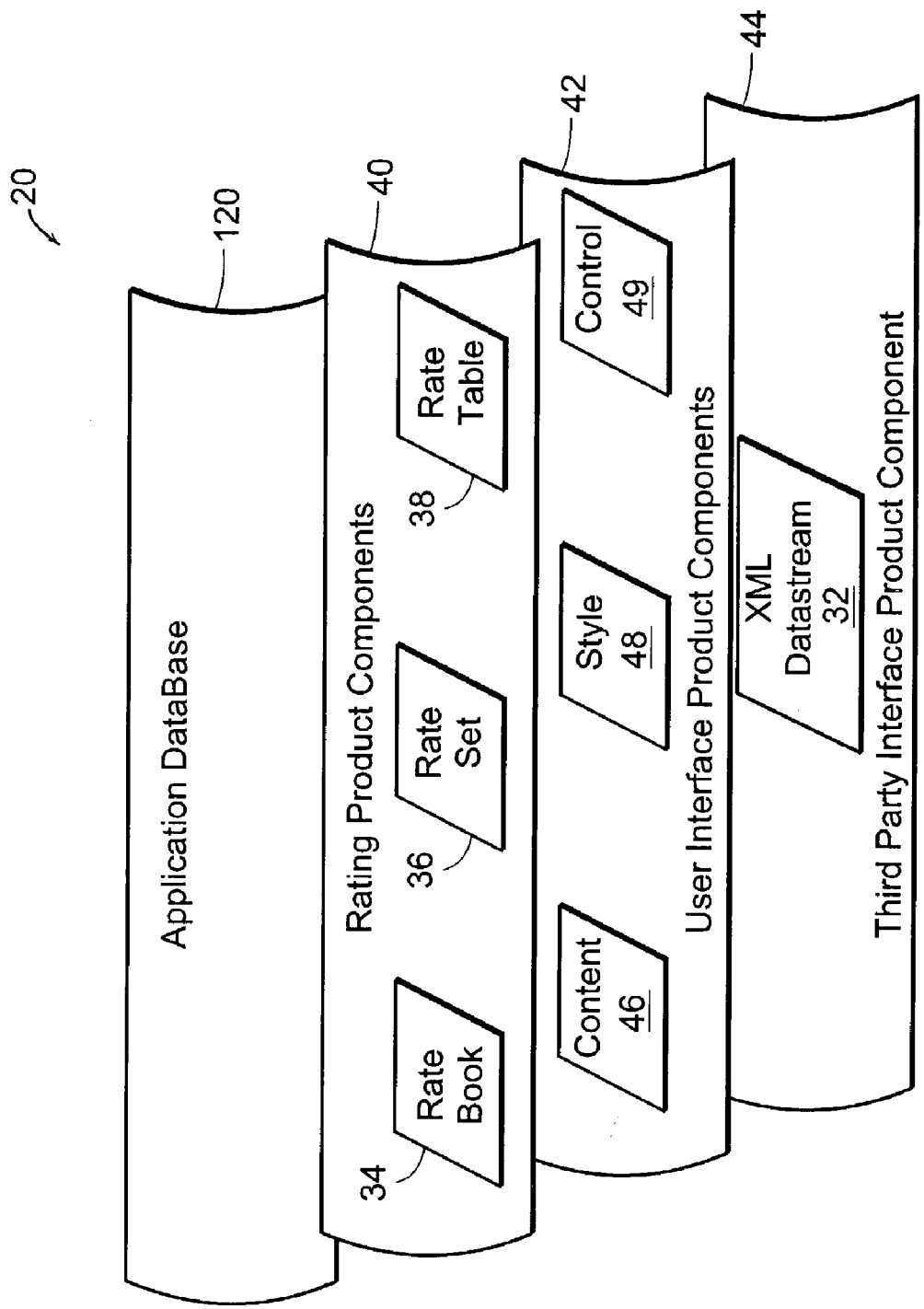
FIGS. 4a and 4b are block diagrams of a resulting program product and components thereof for the embodiment of FIG. 1.
Figure 4B:
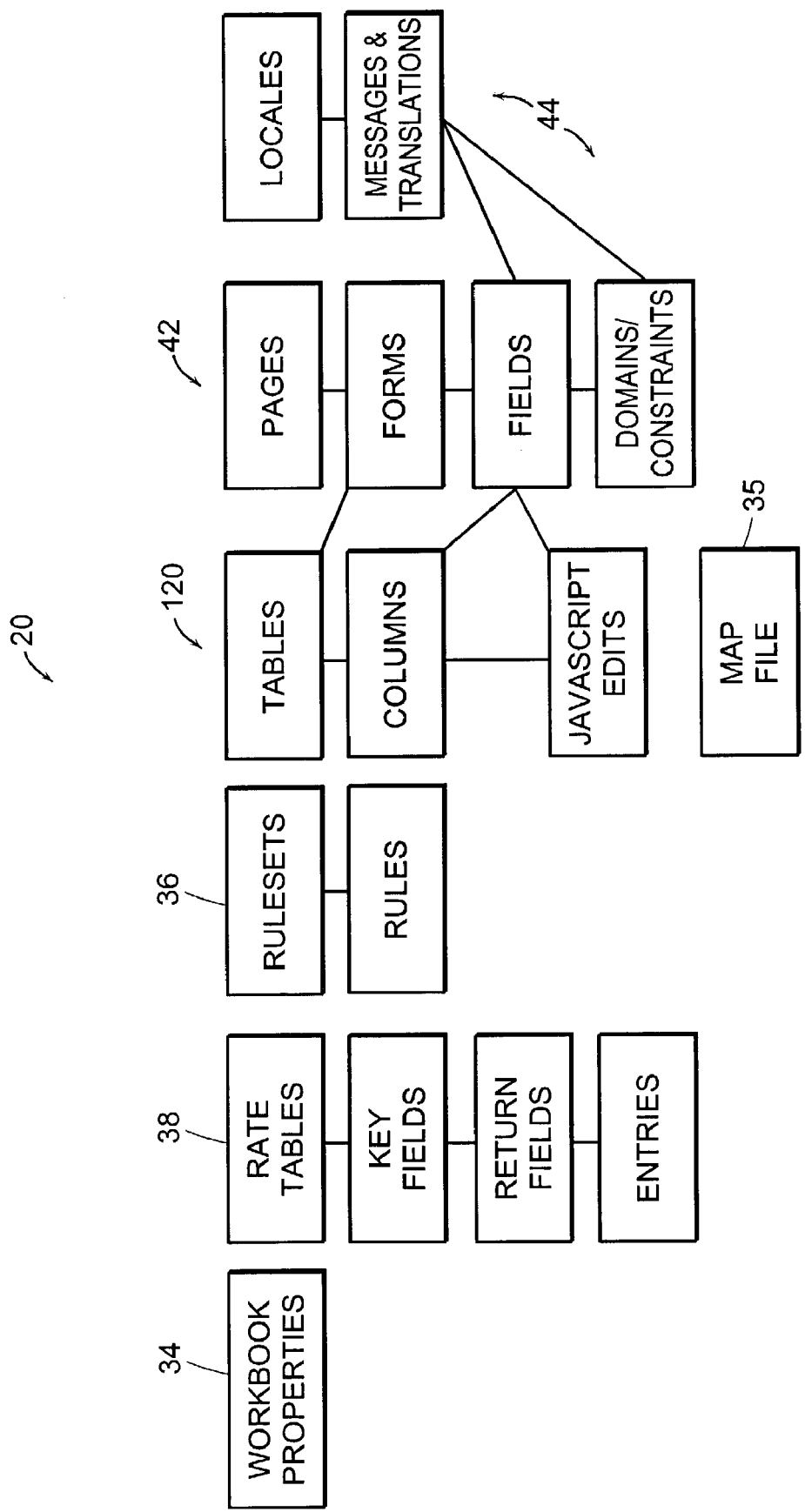

As mentioned above, the result produced by generator 16 is a version of a company-specific software program 20 as stored and maintained in database 12. Each such resulting company-specific software program 20 comprises multiple components. In general, in FIG. 1 there are rating components 40, user interface (UI) components 42, third party interface components 44 and an applications database 120. FIGS. 4a and 4b further illustrate these components.

The rating components 40 include company ratebooks 34 and a series of rule sets 36 and rate tables 38 that provide the interpretation of a company manual to underwrite and rate a line of business within a rating engine. In one embodiment, Compu-quote tables or similar tables are included.

The user interface components 42 include, for example, Web-based user interfaces (e.g., Web pages and forms), used to capture and present information. This may include a content component 46, a style component 48 and a control component 49. In a preferred embodiment, Java-scripts for client side editing are included here.

The third party interface components 44 include pertinent data streams 32, that is a data collection from external sources of information (such as MVR's) and the process to acquire this data. An interface file layout (such as fields, domains/constraints) and messages and translations (FIG. 4b) enable working access or communication with subject data streams 32.

Figure 5:
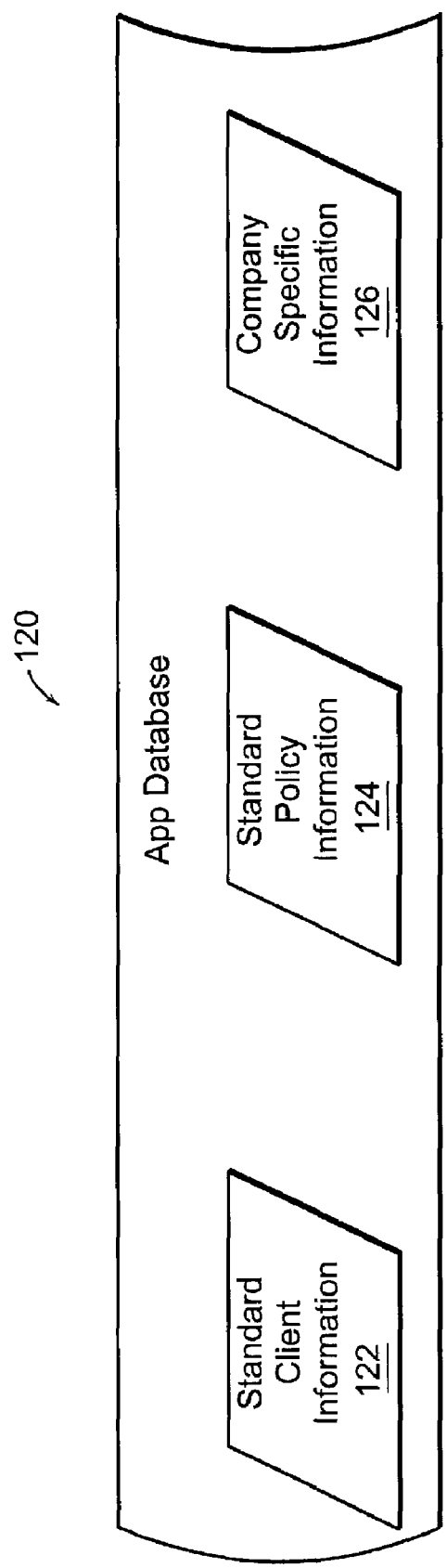

The application database 120 contains standard client information/data 122. standard policy information 124 and company-specific data 126 as illustrated in FIG. 5. The application database 120 tables and columns support the Java-scripts, forms and fields in the user interface components 42 as shown in FIG. 4b. Generated program 20 also includes a mapping file 35 that describes the structure of application database 120.

Surrounding the domain management system 18 of FIG. 1 is a series of tool sets 60 (FIGS. 3a and 3b) that facilitate the build (program product generation) and maintenance processes. These tool sets 60 access the information contained within the domain management system database 12 to provide the following capabilities:

Build a base software program/product 20 once and use it in multiple different company implementations;

Allow company-specific changes to be applied to the base software program/product (the "base/exception" approach);

Identify developed company-specific software programs 20 affected by changes to industry "quasi-standards";

Identify developed company-specific software programs 20 affected by changes to third party products 30;

Identify all product components 40, 42, 44 related to an industry quasi-standard, allowing software makers and insurance companies to understand the full impact of a change.

Figure 3A:
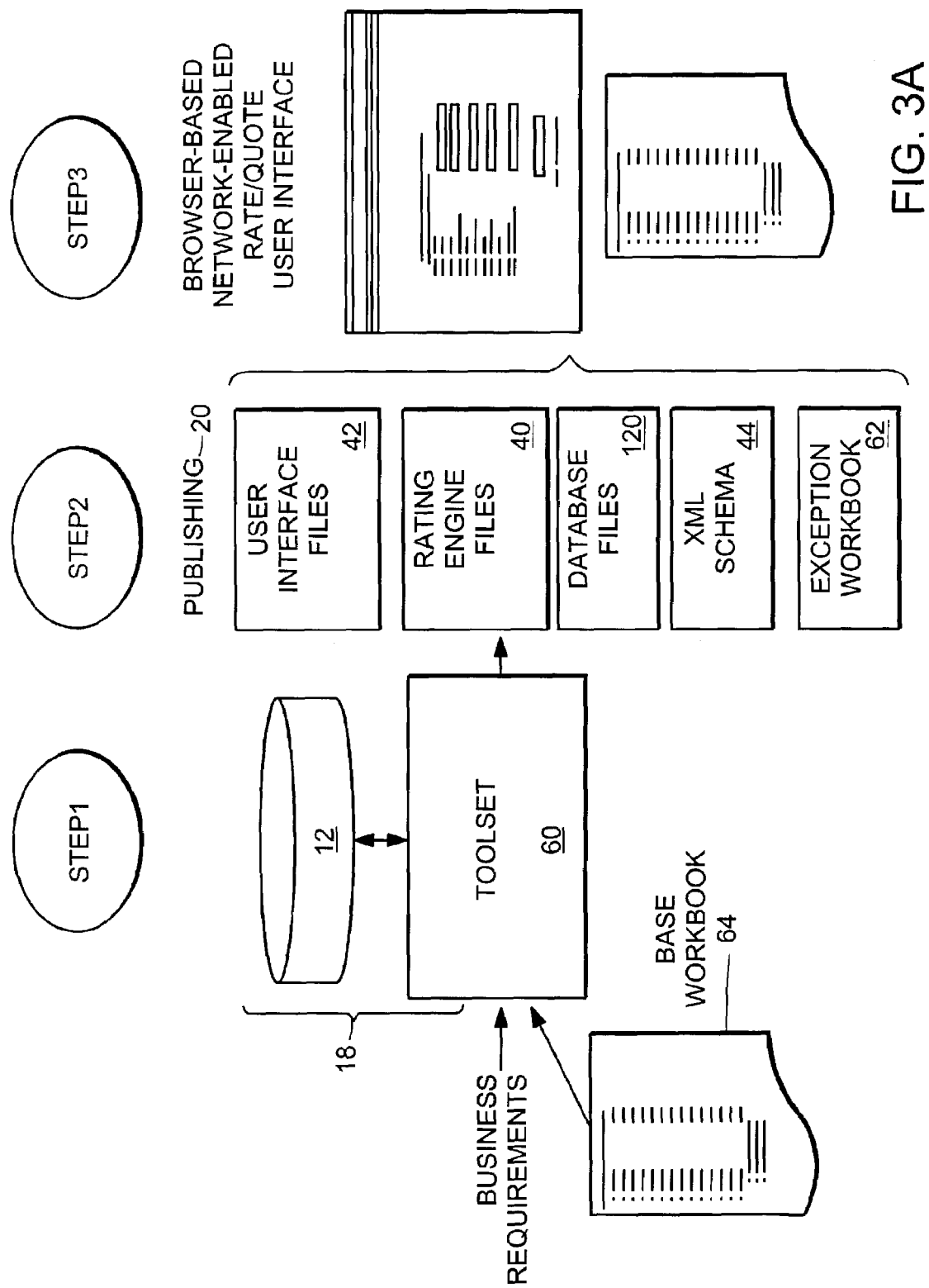
FIGS. 3a and 3b are flow diagrams of the overall flow of data and operation in the embodiment of FIG. 1.
Figure 3B:
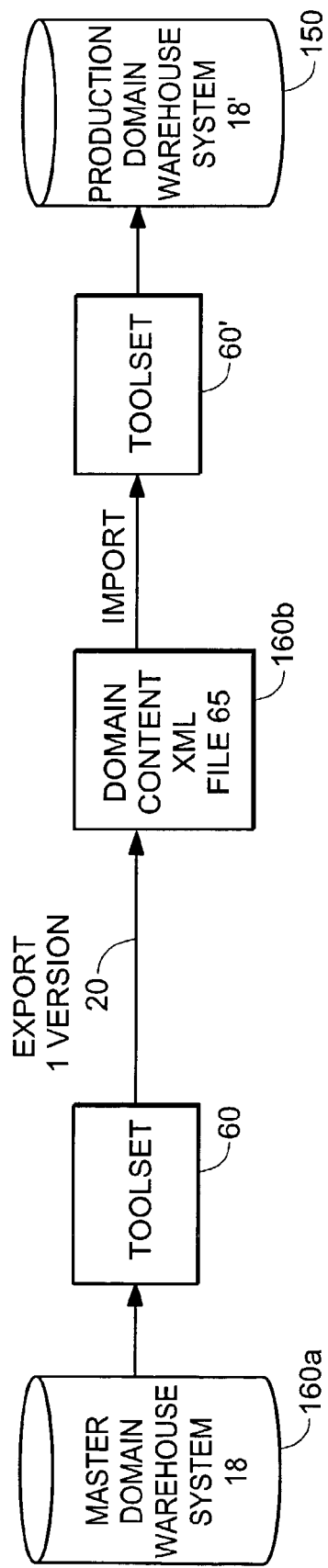

Use of the tool sets 60 with database 12 is outlined in the flow diagrams of FIGS. 3a and 3b. Business requirements and initial data are entered using tool set 60 at Step 1 in FIG. 3a. In the above example, the initial data includes end user insurance company identification, line of business, policy type, effective date and the like. Based on this initial data, product generator 16 produces a base workbook (the base portion) 64.

At Step 2 in FIG. 3a, product generator 16 so called publishes or generates the desired version of software program 20 as discussed in FIGS. 1 and 2 above. The generated program 20 includes user interface file 42, rating engine files 40, application database files 120 and third party interface (XML) files 44 as discussed in FIGS. 4a and 4b. Optionally, output is an exceptions report 62. The exceptions report 62 is an electronic workbook which identifies what changed in the latest version to the users.

Figure 6:
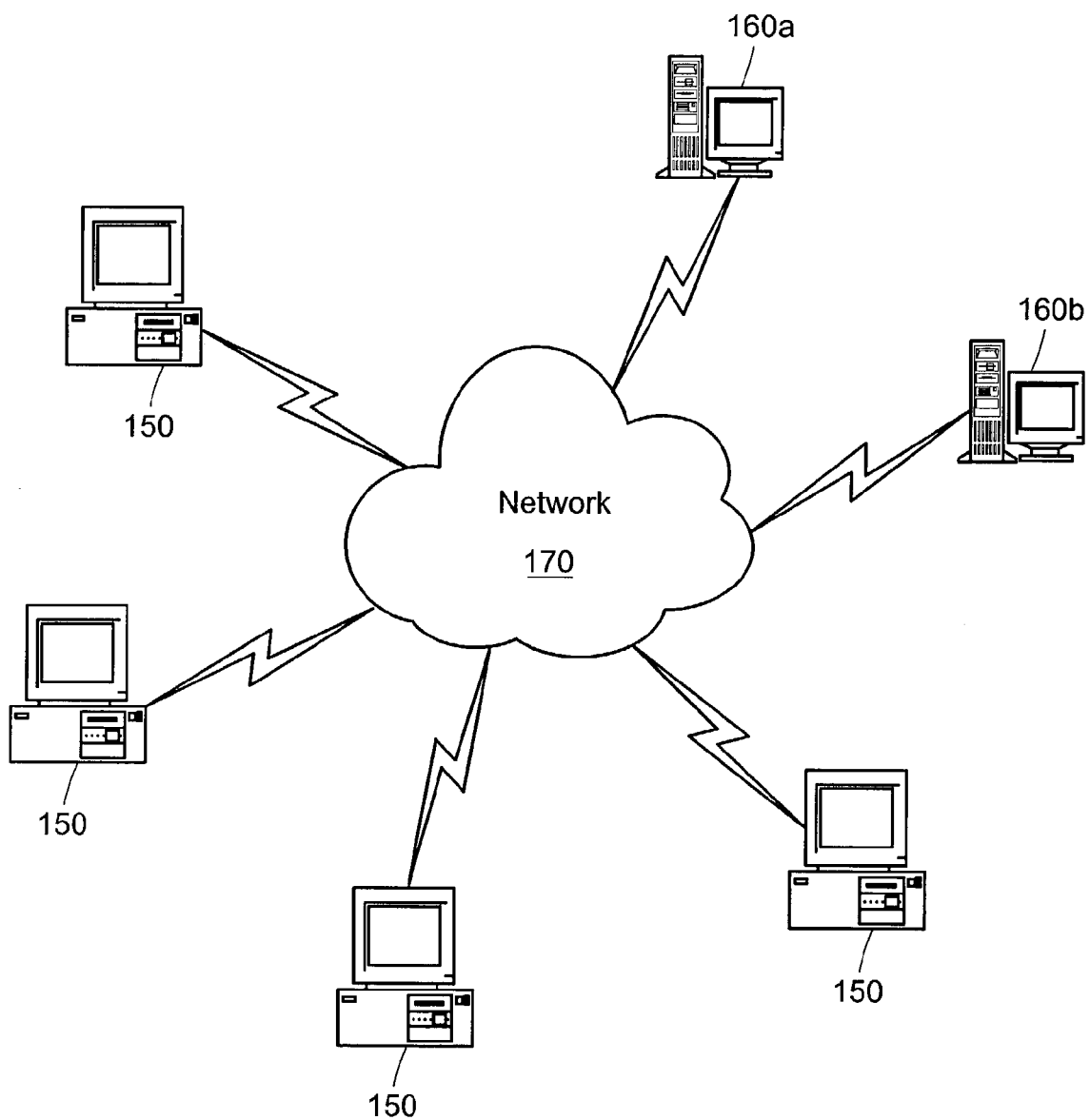
FIG. 6 is a computer network environment in which the embodiment of FIG. 1 may be executed.

At Step 3 in FIG. 3a, the resulting program 20 is placed on a Web server (or similar computer) for testing or for access by a client (e.g., a rating engine), or for access by another working software application. The rating engine/ other working applications and invention system 18 may be communicating across a global network 170 as illustrated in FIG. 6.

Briefly, client computer 150 and server computer 160 provide processing, storage, and input/output devices for the invention DMS 18 system with tool sets 60. The client computers 150 can also be linked through a communications network 170 to other computing devices, including other client computers 150 and server computers 160. The communications network 170 can be part of a global network (e.g., the Internet), a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the DMS 18 system with tool sets 60 can be implemented on a stand-alone computer.

Referring to FIG. 3b, in the preferred embodiment, a master invention system 18 resides on respective server computer 160a. Using tool set 60, as described in FIG. 3a a first version of a desired (company specific) program 20 is published and exported to a test server 160b. The export operation produces corresponding XML files 65 of the subject program 20. Tester-users use the XML files 65 to determine whether the subject program 20 meets the parameters of the respective insurance company. Once testing has been completed, the respective insurance company may import the program XML files 65 to one or more of its client computers 150. The insurance company accomplishes this through a local copy of the tool set 60', and a local, company-specific version (client side) of the invention system 18'.

The following examples further illustrate the functional efficiencies of the present invention method and system 18. The examples are for purposes of illustration, not limitation of the present invention.

EXAMPLE 1

Company X provides geographic data to the insurance industry. The majority of insurance companies utilize data from X in some of their premium development; therefore, X is considered a standards organization to the insurance industry. Based on the zip code of a geographic area, X provides a measurement of the groundwater pollution prevalent in the area. Company A translates the measurement into a rating factor that is applied to the pollution of a Commercial General Lines (CGL) policy, which is typical among most insurance companies. Company B chooses to not utilize the groundwater pollution measurement in determining the pollution premium; however, they want to capture the information for risk management purposes only. The present invention system 18 may electronically feed an independent risk management firm (RM1) to inspect prospective risks for some of the client base of database 12; the firm uses the groundwater pollution information to help insured's develop risk management programs. Company B uses RM1 to provide risk management services, while Company A does not.

The following steps are required with respect to groundwater pollution:
- Fields are needed within the invention database 12 to capture the groundwater pollution measurement and the groundwater pollution factor;
- Within the user interface 42 for CGL policies, the location information screen must return the groundwater pollution measurement based on the zip code of the location;
- System 18 programmers must build a pollution modification rule set within the CGL rating template, the result of which is applied against the pollution premium.

The domain management system 18 maintains the following relationships related to groundwater pollution:
- Database data 12 capturing definitions are cross referenced to X's groundwater pollution rule;
- User interface 42 screen definitions are cross referenced to X's groundwater pollution rule;
- Rating files 40 include in the rule set definitions cross references to X's groundwater pollution rule;
- The correlation between the database 12, user interface 42 and rating files 40 definitions with respect to X's groundwater pollution rule;
- The adoption of database 12, user interface 42 and rating component 40 definitions associated with X's groundwater pollution rule by Company A;
- The adoption of database 12 definition for groundwater pollution measurement by Company B. In addition, the choice not to adopt the database 12 definition for groundwater pollution factor, the user interface definitions 42 and the rating definitions 40 associated with X's groundwater pollution rule;
- The choice to use RM1's services by Company A.

It is important to note that these relationships may change over time; thus the DMS 18 maintains an audit trail of the relationships as changes occur.

EXAMPLE 2

The following example is intended to serve as a high level walkthrough of the DMS concepts, using an example that resembles common insurance industry practices.

Assume that the existing countrywide rule related to Homeowners Medical Payments Coverage for the ACE Rating Bureau is as follows: $1000 Medical Payments Coverage is available at no charge. This coverage may be increased for an additional charge as follows:

| Limit    | Premium |
| -------- | ------- |
| $5,000   | $10     |
| $10,000  | $15     |

The state of Maine was consistent with the countrywide rule until Jan. 1, 2001 when the following exception applies to the ACE countrywide rule for Medical Payments:

Medical Payment Limits of $7,500 are available for a premium of $13.

Company ZZZ, a subscriber to ACE, deviates (effective Jun. 1, 2001) from the Maine Medical Payments premiums as follows:

| Limit    | Premium |
| -------- | ------- |
| $1,000   | $3      |
| $7,500   | $12     |
| $10,000  | $14     |

The $5,000 coverage is not available. In addition, a $2,000 limit is available for a charge of $6.

The database 12 portion of the DMS 18 identifies the raw data recognized by an external source (standards organization or unique insurance company information) 30. This information is comprised of two sections, field definition and field choice definition.

Field Definition
Table Name=Home
Field Name=MedPayLimit
Field Attributes=Picklist
Table Name—Home
Field Name=MedPay Premium
Field Attributes=Integer
Field Choice Definition
Table Name=Home
Field Name=MedPay Limit
Field Choice=$1,000
Table Name=Home
Field Name=MedPayLimit
Field Choice=$5,000
Table Name=Home
Field Name=MedPay Limit
Field Choice=$7,500
Table Name=Home
Field Name=MedPay Limit
Field Choice=$10,000

Note—The Field Choice Definitions are indexed to the Field Definitions, to establish a relationship between the entries of the two tables.

In the invention DMS 18, the hierarchy (country, line of business, state and company) to which the database 12 information belongs is maintained as in the below table:

Each record within the database 12 is flagged with the external source's 30 effective date and time for the information. A record no longer in use by an external source 30 is flagged as a deletion.

EXAMPLE 2 CONTINUED

Rating

Rating 40, one of the developed product 20 components may be broken down into two areas: rating rule sets 36 and rating tables 38. A rating rule set 36 may be defined as a series of rules that provide rating/underwriting functions using messaging, algorithmic, conditional or rate table lookup functions. Each rule set 36 consists of one or more data elements which can be found within the database 12 of the DMS 18.

For example, the Medical Payments Coverage rule set looks as follows within a rating engine that receives and processes the given product 20:

The Homeowners Medical Payments rule set 36 is saved with attributes embracing the hierarchy of deviation for the ACE Rating Bureau. The following attributes are stored with the rule set 36 in that example:

| Rating Bureau | LOB | Country | State | Company | Company Code | _ | Base Rule | Sub-Rule | NewBiz Effective Date | Renewal Effective Date |
|---|---|---|---|---|---|---|---|---|---|---|
| ACE | HO | US | XX | 1 | XXX | _ | ME DE | XX | 20010101 | 20010101 | where:

"Rating bureau" is a unique code for the rating bureau;

"LOB" (line of business) is a unique code for the line of business being insured;

"Country" is a code for the country;

"State" is a code for the state/province if it applies. Use of XX as the state code provides a countrywide rule;

"Company" is a code that determines if this rule is company specific or not. Use "1" for non-specific and "2" for specific. If the rule is company specific, the next portion of the file name contains the company code;

| Table Name | Field Name | Field Choice Name | External Source | Line of Business | Country | State | Company | Date and Time | Deletion | Premium |
|---|---|---|---|---|---|---|---|---|---|---|
| Home | MedPay Limit | $1,000 | ACE | HO | US | | | Jan. 1, 1900 12:00 am | | $3 |
| Home | MedPay Limit | $2,000 | ACE | HO | US | ME | ZZZ | Jun. 1, 2001 12:00 am | | $6 |
| Home | MedPay Limit | $5,000 | ACE | HO | US | | | Jan. 1, 1900 12:00 am | | $10 |
| Home | MedPay Limit | $5,000 | ACE | HO | US | ME | ZZZ | Jun. 1, 2001 12:00 am | Y | |
| Home | MedPay Limit | $7,500 | ACE | HO | US | ME | ZZZ | Jun. 1, 2001 12:00 am | | $12 |
| Home | MedPay Limit | $7,500 | ACE | HO | US | ME | | Jan. 1, 2001 12:00 am | | $13 |
| Home | MedPay Limit | $10,000 | ACE | HO | US | | | Jan. 1, 1900 12:00 am | | $15 |

"Company code", if non-specific, the code is XXX. If specific, the two character field is populated with a predetermined code for that company.

"_" is an underscore signifying a pause in the file name (for readability purposes);

"Base rule" is a code representing the manual rule within that line of business;

"Sub-rule" is a logical subset within a base rule (one rule set may consist of multiple sub-rule sets). This breakdown only occurs within complicated rule sets; otherwise, populate with XX;

"NewBiz Effective date" is the effective date of the rate table for new business policies. In the preferred embodiment, the format is a 4 digit year indication followed by 2 digit month and 2 digit day indications (YYYYMMDD);

"Renewal effective date" is the effective date of rate table for renewal policies (in the YYYYMMDD.format).

The rule set 36 also gets saved within a company ratebook 34, a series of rating and underwriting rules and rate table lookups that provide the interpretation of a company manual. The relationship between the ratebook 34 and the rule set 36 is stored within database 12 tables of DMS 18.

| Company | Ratebook | Rule Set |
| --- | --- | --- |
| ZZZ | ZZZHO20000101.rbk | ACEHOUSXX1XXX_MEDPXX20010101.rul |

The ratebook 34 is also defined with attributes that uniquely identify each company product 20:

| Rating Bureau | LOB | Country | State | Company Code | _ | New Biz Effective Date | Renewal Effective Date |
| --- | --- | --- | --- | --- | --- | --- | --- |
| ACE | HO | US | ME | ZZZ | _ | 20010101 | 20010101 |

The attributes associated with each rule set 36 and ratebook 34 are defined within the hierarchy in which they are stored.

Additional entries in the rating rule set 36 may include:

| Rating Rule Set | Table Name | Field Name |
| --- | --- | --- |
| ACEHOUSXX1XXX_MEDPXX20010101.rul | Home | MedPayLimit |
| ACEHOUSXX1XXX_MEDPXX20010101.rul | Home | MedPayPremium |

A rating table 38 may be defined as an individual rule within a rule set 36 where a lookup is performed, based on variables passed to the rating engine from the calling application. The governing rules for a rule set 36 do not necessarily correspond to those of a rate table 38; for example, a company may deviate from rate table values without deviating from the actual rule set 36. Therefore, the cataloging and tracking of rating tables 38 should be independent of rule sets 36.

The Company ZZZ Maine Homeowners Medical Payments rate table 38 is saved with attributes that embrace the hierarchy of deviation for the ACE Rating Bureau. The attributes are as follows:

| Rating Bureau | LOB | Country | State | Company | Company Code | _ | Rate Table Name | NewBiz Effective Date | Renewal Effective Date |
| --- | --- | --- | --- | --- | --- | --- | --- | --- | --- |
| ACE | HO | US | ME | 2 | ZZZ | _ | MEDPAY | 20010601 | 20010601 | where:

"Rating bureau" is a unique code for the rating bureau;

"LOB" (line of business) is a unique code for the line of business;

"Country" is a code for the country;

"State" is a code for the state/province;

"Company" is a code that determines if this rule is company specific or not.

"Company code", if non-specific, the code is XX.

"Rate Table Name" is a unique naming convention for rate table;

"NewBiz Effective Date" is rate table effective date for new business policies, in year, month, day format (YYYYMMDD);

"Renewal Effective Date" is rate table effective date for renewal policies in YYYMMDD format.

It is very important to note that, in the above example, the rule set 36 is saved at the countrywide level and the rate table 38 at the state level. The reason for this is that the field choice names are updated for the state of Maine, but the actual algorithmic calculation not altered. The construct of the rate tables is altered for Maine (due to the changes in the field choices), but the method for obtaining a premium (performing a rate table lookup) is not. The rate tables 38 are saved within a hierarchy in a similar fashion as the ratebooks 34 and rule sets 36, with a naming convention that contains the rate table name and effective date.

The rate table 38 catalogs database fields that serve as elements of the rate table lookup. In addition, the rate table 38 identifies the rule set 36 to which the rating table 38 is attached:

| Rating Table | Rule Set |
|---|---|
| ACEHOUSMA2ZZZ_MEDPAY20010601.tbl | ACEHOUSXX1XX_MEDPXX20010101.rul |

EXAMPLE 2 CONTINUED

User Interface

One preferred embodiment separates its user interface product components 42 into three component parts: content component 46, style component 48 and control component 49 (FIG. 4). The content component 46 contains all the data associated with countrywide, state and company-specific lines of business information. This information is stored in HTML or XML files. The style component 48 contains the look and feel of documents stored as CSS or XSL files, whichever applies. Lastly, control components 49 are those files that define how information within a particular document, form or field should act. If controls 49 are global and common to many HTML pages, they are provided as external files, referred to as server-side JavaScript. If controls 49 are implemented on individual insurance company request, the controls are provided internal to the HTML pages, known as client-side JavaScript. Other control 49 elements may be written and stored directly into the content of a file; this is referred to as DHTML (Dynamic Hypertext Markup Language).

Preferably, three UI components 46, 48, 49 are stored within Visual Source Safe, a version control system that enables the management of individual and team projects regardless of file type. The file structure defined in VSS for the content component 46 is based on the hierarchy of deviation. The parent folder is the line of business; for example, business owners (BOP), homeowners (HO) or personal auto (PA). Once one is within a line of business, the structure follows the same logic:

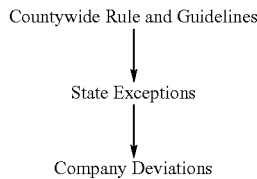

Countywide Rule and Guidelines
↓
State Exceptions
↓
Company Deviations

This storage structure allows for a quick and easy build of Company ZZZ's product by housing a standard set of UI's 42 with LOB and state combinations. Therefore, when Company ZZZ deviates from the state of Maine's exception to Medical Payment limits, the Maine homeowners content 46 template is taken from VSS and developed into a customer-specific solution.

Global control 49 functionality (conditional logic, validations and navigation) is included in the Maine homeowners product 20. If Company ZZZ has specific company logic that needs to be followed, this too will be stored in VSS in a folder structure that notes the control files 49 as a company deviation.

Lastly, the style component 48 or look and feel of the UI, is a standard template provided by the preferred embodiment unless otherwise requested by Company ZZZ. All deviations from the standard style 48 are also stored in VSS.

Standard naming conventions are created based on the blend of files used to create a company-specific UI 42. For example, Company ZZZ's file reference would contain the following attributes:

| LOB | State | Company | Screen Name | Controls Applied | Style # Applied |
|---|---|---|---|---|---|
| HO | ME | ZZ | Policy | ABC | 1 |

EXAMPLE 3

Continuing with the above Medical Payments Coverage example, the following situations discuss how the DMS 18 addresses changes that may occur with customer (insurance company) products.

Changes to Rules or Guidelines of a Standards Organization

Assume that the countrywide medical payments rule is updated, effective Sep. 1, 2001, to include an additional factor in the calculation. The new rule states to multiply the rate table lookup by an IRPM factor to derive the premium. The State of Maine chooses not to adopt the countrywide rule.

The invention database 12 is updated for the IRPM factor:
Table Name=Home
Field Name=IRPM Factor
Field Attributes=Decimal The source relationship table 14 is updated to include the IRPM factor:

| Table Name | Field Name | Field Choice Name | External Source | Client | Country | Line of Business | State | Company | Date & Time | Deletion |
|---|---|---|---|---|---|---|---|---|---|---|
| Home | IRPM Factor | | ACE | | US | HO | | | Sep. 1, 2000 12:00 a.m. | |

The Medical Payments Coverage rule set 36 is updated to include the IRPM factor in its calculation.

The ACE homeowner medical payments rule set 36 is saved with an updated effective date. The attributes of this rule set 36 are as follows:

| Rating Bureau | LOB | Country | State | Company | Company Code | | Base Rule | Sub-Rule | NewBiz Effective Date | Renewal Effective Date |
|---|---|---|---|---|---|---|---|---|---|---|
| ACE | HO | US | XX | 1 | XXX | _ | MEDP | XX | 20010901 | 20010901 |

The new entries in the rating rule set 36 are as follows:

| Rating Rule Set | Table Name | Field Name |
|---|---|---|
| ACEHOUSXX1XXX_MEDPXX20010901.rul | Home | MedPayLimit |
| ACEHOUSXX1XXX_MEDPXX20010901.rul | Home | MedPayPremium |

It now becomes necessary to identify all clients affected by the change to the countrywide ACE homeowner medical payment rule set 36. This is accomplished by scanning the rating rule set file 36 to identify all insurance company's ratebooks 34 where this rule set 36 is in use. These insurance companies can then be contacted to initiate the change process.

Changes to Company-Specific Rules or Guidelines

The steps involved with changing a company-specific rule is similar to that of a rule change provided by a standards organization, with one exception: there is no need to search the rating rule set file 36 to identify all insurance company ratebooks 34 affected by the change.

Changes to Choices (Picklist)

Assume that the Maine medical payments rule is updated, effective Sep. 1, 2001, to allow for a $20,000 limit of coverage. The premium associated with this limit is $17. Company ZZZ adopts this new limit, however, their premium charge is $16.

Database 12 is updated to include the new choice for Medical Payments Limit:

| Table Name | Field Name | Field Choice Name | External Source | Client | Country | Line of Business | State | Company | Date & Time | Deletion |
|---|---|---|---|---|---|---|---|---|---|---|
| Home | Medical Paymts. Limit | $20,000 | ACE | | US | HO | ME | | Sep. 1, 2000 12:00 a.m. | |

A new rate table is required to capture the company-specific premiums related to the updated medical payments limits of coverage. The company ZZZ Maine Homeowners Medical Payments rate table is saved with an updated effective date. The file attributes are as follows:

| Rating Bureau | Line of Business | Country | State | Company | Company Code | _ | Rate Table Name | Effective Date |
|---|---|---|---|---|---|---|---|---|
| ACE | HO | US | ME | 2 | ZZZ | _ | MEDPAY | 20010901 |

Company Decides to Deviate from Standards Organization Rule

Assume that the "MOD" Insurance Company chooses not to adopt the countrywide rule for medical payments, effective Sep. 1, 2001. Instead of using the RPM factor seen in the countrywide calculation, MOD multiplies the rate table lookup by a constant rate, 0.75, to derive the premium.

The invention database 12 is updated for the Maine factor:
Table Name=Home
Field Name=MedPayFactor
Field Attributes=Decimal The database 12 is updated to include the MOD med pay factor:

rating rule set files 36 to identify all insurance companies ratebooks 34 where this rule set 36 is in use. These insurance companies can then be contacted to initiate the change process.

Company Decides to Move from Company Deviation to Embracing Standards Organization After using the company specific medical payments rule for a year, MOD moves back to the original countrywide medical payments rule, effective Sep. 1, 2002.

The database 12 is updated to indicate that the MOD Med Pay factor is no longer in use, by flagging the field as a deletion:

| Table Name | Field Name | Field Choice Name | External Source | Client | Country | Line of Business | State | Company | Date & Time | Deletion |
|---|---|---|---|---|---|---|---|---|---|---|
| Home | Medpay Factor | ? | ACE | | US | HO | XX | MOD | Sep. 1, 2000 12:00 a.m. | |

The Medical Payments Coverage rule set 36 is updated to include the MOD medical pay factor in its calculation.

The ACE homeowner medical payments rule set 36 for MOD is saved with an updated effective date. The attributes of the rule set are as follows:

| Rating Bureau | LOB | Country | State | Company | Company Code | _ | Base Rule | Sub-Rule | NewBiz Effective Date | Renewal Effective Date |
|---|---|---|---|---|---|---|---|---|---|---|
| ACE | HO | US | XX | 2 | MOD | _ | MEDP | XX | 20010901 | 20010901 |

The new entries in the rating rule set 36 are as follows:

| Rating Rule Set | Table Name | Field Name |
|---|---|---|
| ACEHOUSXX2MOD_MEDPXX20010901.rul | Home | ModMedPayFactor |

It now becomes necessary to identify all clients affected by the change to the countrywide ACE homeowner medical payment rule set 36. This is accomplished by scanning the

| Table Name | Field Name | Field Choice Name | External Source | Client | Country | Line of Business | State | Company | Date & Time | Deletion |
|---|---|---|---|---|---|---|---|---|---|---|
| Home | Medpay Factor | | ACE | | US | HO | XX | MOD | Sep. 1, 2002 12:00 a.m. | X |

The ACE homeowner medical payments rule set 36 for MOD is also flagged as deleted:

| | | | | | Deleted Effective Aug. 31, 2002 | | | | |
|---|---|---|---|---|---|---|---|---|---|
| Rating Bureau | LOB | Country | State | Company | Company Code | Base Rule | Sub-Rule | NewBiz Effective Date | Renewal Effective Date |
| ACE | HO | US | XX | 2 | MOD | — | MEDP | XX 20010901 | 20010901 |

A new homeowner ratebook 34 is created for MOD effective Sep. 1, 2002. The countrywide medical payments rule set 36 will replace the MOD company-specific medical payments rule set 36 in the new ratebook 34:

| Customer | Ratebook | Rule Set |
|---|---|---|
| MOD | MODH020020901.rbk | ACEHOUSXX1XXX_MEDPXX20010901.rul |

All MOD homeowner policies with policy effective dates prior to Sep. 1, 2002 will access the old ratebook 34 containing company-specific medical payments rating algorithms; all policies effective on or after Sep. 1, 2002 will access the new ratebook 34 with countrywide medical payments rating algorithms.

EXAMPLE 4

The following example demonstrates how the domain management system 18 is utilized in the creation of new company program products 20.

Developing New Company Rate Books—First Company for a Given LOB/Rating Bureau

Recall that there is a hierarchy used for storing ratebooks 34, rule sets 36 and rate tables 38:

As the first rating product 40 is built for a line of business, each rule set 36 and rate table 38 represented in the rating manual is saved within the directory representing the appropriate hierarchical level (company, state or country) for the LOB/rating bureau. A ratebook 34 is saved at each hierarchical level, thus creating a countrywide, state and company ratebook 34 for the LOB/rating bureau. The state ratebook 34 contains all countrywide rules for which there is no state exception; the company ratebook 34 contains all company deviations from the state ratebook 34. In the above example, a United States, Maine and Company ZZZ ratebook 34 exists for Rating Bureau I/homeowners when rating development for Company ZZZ is complete.

Developing New Company Rate Books—Second Company for a Given LOB/Rating Bureau

The ratebooks 34, rule sets 36 and rate tables 38 previously saved at the countrywide and state levels all become available for subsequent product 20 development. Using the above example, assume that Company YYY (a subscriber to Rating Bureau 1) requests programmers to develop their Maine homeowner product 20. The Maine ratebook 34 previously created for Rating Bureau 1/homeowners will now be available as a starting point for development of the Company YYY product. Once the countrywide and state ratebooks 34 have been finalized for a LOB/rating bureau combination, only the company-specific deviations need to be developed for each subsequent customer (insurance company).

One of the toughest challenges met by Applicants' is how to stratify the product 20 content into base/exception layers in a way that provides the greatest long-term maintenance efficiency and is consistent across products.

The underlying premise of the base exception development approach is that insurance companies' products 20 are generally quite similar by line of business due to the influence of various regulatory bodies and rating bureaus that contribute to defining the product requirements.

The next most important premise is that the true cost of P&C product and rating solution management is not in the initial implementation but rather the long-term maintenance costs.

Applicants' base/exception strategy is based on a rating service making a single change that automatically updates multiple companies products 20. This lowers labor costs, reduces errors and shortens implementation timeframes.

Those companies that elect to use the tools of the present invention directly will benefit from the availability of the base product(s) 20 and the tool sets that minimize errors and streamline the process. They will lose the benefits of a single change being done for multiple companies lowering overall maintenance costs.

Inheritance:

The use of the inheritance capability within object-oriented programming is the technology that makes the base exception process work in the present invention system 18. It is important to understand the concept of inheritance as used in system design to understand how and why items can be placed at specific levels. The following is meant to provide sufficient knowledge to determine how inheritance works in the present invention environment.

The rules defining inheritance are:
(i) Inheritance is a serial process. A child always inherits from the parent, the parent from the grandparent, etc.
(ii) An object cannot inherit something that is not from one of its ancestors.
(iii) One may add something to an existing generation and all children will/may adopt that trait.
(iv) A trait may intentionally be "lost" in each inheritance. It never reappears but can be re-added. (Note this is generally bad design).
(v) A new trait (mutation) can be added in each inheritance. It is then available to all subsequent inheritances—unless it is intentionally lost in a later generation.

Basic Criteria:

Determining what is placed in each level is often a compromise. As a result, it is as much of an art as it is a science. However consistency across lines is important, and one can predetermine some rules for placing content at different levels and as a result define a standard way of building templates.

As a Primary Rule, the base exception architecture is to allow policy structures and rates to be maintained (not created) at the lowest possible cost and effort.

Present Invention Structures:

One extreme structure would be to make all products 20 a single level placing every line of business, state and company item in one level, but then the potential for sharing common characteristics—being all common to one level of inheritance they can't be passed on—is lost.

Example: A, B, C, D, E, 1, 2, 3, !, @, #

The other extreme is making everything in the system 18 a unique level. This makes for very flexible changes—every change is always reflected to everyone that inherits the item—but results in no logical grouping of items that can be understood and managed together. As a result little or no maintenance efficiency is gained.

Example:
A
B
C
D
E
1
2
3
!
@

Applicants discovered that there is a need to develop a logical way to stratify the system content into layers that organize like things together in layers that are maintained together. Thus, Applicants devise and utilize a structure between the above extremes as follows.

The most common structure for the invention products 20 is, by way of example:

| | |
|---|---|
| Company | Concord Company |
| State | Maine |
| Bureau | ISO |
| Line of Business | Personal Auto |
| System Wide | XX |

This basic structure can and will be varied to handle other policy structures such as homeowners/mobile home:

Company
State
Bureau
Mobile HO
HO
System Wide

This structure is chosen as it allows three policy structures to be managed from a single implementation: Homeowners only, Mobile Home only and a combined Homeowner/Mobile Home policy. One change to a homeowner rate or other policy characteristic will be inherited by all three possible structures.

Another special view is the Package Policy where a layer exists between the systemwide layer and the Line of business layer.

Company
State
Bureau
Commercial Auto, Commercial Property, Commercial Umbrella
Package level
System Wide Remember, the main goal of these templates beyond accurately defining a policy is to make it easy and inexpensive to maintain policy characteristics after they are implemented.

Typically in each level are the following.

The system wide level contains characteristics/data that are common to all policy types across all lines of business. For example,
  (i) Table structures even if the content is defined at a higher level, and
  (ii) Common edits such as in a field X are systemwide level items.

The LOB (product) level contains items that are typical to a line of business without regard to the state. Examples are:
  (i) User interface characteristics,
  (ii) Rate table structures, and
  (iii) Domain table content such as auto makes/models.

The bureau level contains items that are defined by the bureau:
  (i) Loss costs
  (ii) Rate tables
  (iii) Algorithms
  (iv) Forms to be applied The State level contains items that are state specific for a particular LOB (line of business). For example, algorithms and rate table content that is specific to a state, are state level items.

The Company Level contains items requested by a specific insurance company. Often these items will be deletions (nullifications) of items specified in the more standard lower levels. Examples of company level items are:
  (i) Items unique to the company coverage and supporting rates,
  (ii) Deletion of specific vehicle models as unacceptable due to underwriting criteria, and
  (iii) Increased/decreased relativities for undesirable/desirable locations, classes. etc.

Present Invention Product Content:

In the preferred embodiment, the product 20 content is separated into a number of discrete steps that define specific sub-sets of processing. These discrete steps or subsets are stored in the DMS system 18 and include the below (a) through (j).

(a) Database Tables

The database tables define the structure of each data element used by the system 18. The database table elements and structure are the only items that are not and will not be in a base/exception structure. This is because a single database structure is used by all workbooks. The database table elements and structure are defined as a single level by Line of Business (LOB) and later combined by the system 18 into a single database schema.

Although all the data elements for a LOB are defined, only those fields used in a particular LOB, state and company that are referenced appear in the workbooks.

(b) Rate Table Structures

Rate Table Structures are the definition of rate tables 38 but do not contain any of the content. This allows the rate table 38 whose content varies by state and/or company to have its structure defined once at the lowest level and the contents later defined at a separate appropriate level such as state or company. Rate tables 38 that are only used at a specific state or company should be defined and populated at that level.

(c) Rate Table Content

Rate table content is the actual table entries and should be defined at the lowest common level. For example if a rate table 38 is common at the state level, it should be defined at the state level. If a company chooses to add, delete or modify specific information in a table 38, this should be overridden with an entry at the company level. This allows a single change to update all companies that have not overridden the table entry and for those insurance companies that have overridden the state defaults, the ability to recognize such and notify those companies that they have a conflict.

(d) Domain/Constraints Table Structures

Domain/Constraints Table Structures are the definition of various domain/constraint tables such as "pick lists" and automobile "makes/models". Domain/Constraint table structures do not contain the table's actual contents. This allows a domain table that varies by state and/or company to be defined once at the lowest level and the contents defined at a separate, appropriate level such as state or company.

(e) Domain/Constraints Table Content

Domain/Constraints table content is the actual table entries and should be defined at the lowest common level. For example if a table is common to all auto policies, it should be defined in the LOB Level. If a company chooses to add, delete or modify specific makes or models, this should be overridden with an entry at the company level. This allows a single change to update all companies that have not overridden the table entry and for those customers that have overridden the state defaults, the ability to recognize such and notify those customers that they have a conflict.

(f) Rating Algorithms

In one embodiment, rating algorithms are entered using a tool set that does not allow the algorithms to be separated into various levels. Instead the algorithms must all be built into a single LOB/Company/Bureau/State level. However the ratebooks 34 should be created separating the formulas into the appropriate levels.

In another embodiment, an algorithm tool is utilized and it manages algorithms on a base exception level directly from the ratebook entries.

The rating formulas should be stored at the appropriate level based upon whether they are maintained on a countrywide, bureau, state basis or company specific basis.

(g) User Interface Structure and Content

The user interface structure and content will generally be defined at the line of business level and adjusted through the addition or deletion of fields at the bureau, state and company level. The design should always consider the potential future need to add information to the initial user interface (UI) design.

(h) User Interface Navigation

The user interface navigation sequences the order in which the UI is presented. The present invention standard navigation should be defined at the LOB level with the potential for customer overrides at the company level.

(i) User Interface Edits Using JavaScript

The user interface edits provides the capability to add edits at the field and page level beyond the standard system edits. These can be placed at any level from the systemwide level to the Company level. They should preferably be placed at the lowest level possible. For example, an edit that defines the relationship between the UM/UN coverage on an auto policy should be at the LOB level, an edit that defines whether or not something is numeric is at the systemwide level, and an edit that is unique to a specific company belongs at the Company level.

(j) Policy Forms

Policy Forms such as HO-3 are assigned at the LOB level.

While this invention has been particularly shown and described with references to preferred embodiments thereof, it will be understood by those skilled in the art that various changes in form and details may be made therein without departing from the scope of the invention encompassed by the appended claims.

For example, when standards organization rules or guidelines, third party interfaces or unique company requirements change, embodiments of the present invention may provide:

(a) audit trail of all changes;

(b) identification of all insurance companies affected by the change;

(c) association of updated product component 40, 42, 44 elements with change;

(d) retention of association between prior component elements with prior rule or guideline; and (e) tracking system for insurance company adoption of the change, including correspondence, notes and diary log.

In another example, the present invention system 18 enables management of multiple lines of business, multiple time ranges and multiple insurance companies in generating software products 20.

In addition, the above examples pertain to embodiments of the invention applied to the insurance industry. Other applications and use of the present invention in different industries are contemplated.

Although computer network architecture and configuration are illustrated and discussed in FIG. 6, it is understood that a variety of network or stand alone configurations are suitable for practicing the invention system 18. Parallel processing on one or multiple computers of the various tasks described in the operations of invention system 18 is also within the purview of one skilled in the art.

What is claimed is:

1. Computer apparatus for maintaining a plurality of versions of a software program, comprising:

a data store for storing different portions of each version of the software program, the data store using a base-exception hierarchy such that (i) basic portions that are common to each version are stored at a first level of the hierarchy, and (ii) exception portions that are common to less that all versions are logically coupled to affected basic portions and stored at succeeding levels of the hierarchy in order of decreasing commonality, said exception portions taking precedence over said basic portions by at least one of supplementing, replacing or modifying said basic portions; and a generator coupled to the data store for producing a desired version of the software program upon user command, the generator forming the desired version by selecting basic portions and exception portions from the different levels of the hierarchy in response to the user command.

2. Computer apparatus as claimed in claim 1 wherein the exception portions have effective date indicators and the generator is responsive to the effective date indicators in forming the desired version.

3. Computer apparatus as claimed in claim 1 wherein the data store uses object oriented programming techniques to represent the basic portions and the exceptions portions such that inheritance applies across different portions.

4. Computer apparatus as claimed in claim 1 wherein the software program is for prospecting insurance policies in different lines of business and different jurisdictions, the apparatus enabling a different version for different lines of business and different jurisdictions.

5. Computer apparatus as claimed in claim 4 wherein the first level of the hierarchy corresponds to insurance terms that are acceptable countrywide.

6. Computer apparatus as claimed in claim 5 wherein succeeding levels of the hierarchy correspond to insurance terms according to at least one of different industry standards bureaus, states and insurance companies.

7. Computer apparatus as claimed in claim 4 wherein for the desired version, the generator outputs rating engine files for use as input to a rating engine.

8. Computer apparatus as claimed in claim 7 wherein the rating engine files include at least one of the rate tables and rules files.

9. Computer apparatus as claimed in claim 1 wherein, for the desired version, the generator outputs (a) a user interface, (b) an application database storing data for the desired version, (c) a rules file, and (d) a mapping file describing structure of the application database.

10. Computer apparatus as claimed in claim 9 wherein the generator output further includes a program file enabling importing and/or exporting of the desired version over a global network.

11. A method for maintaining a plurality of versions of a software program in a computer system, comprising the steps of:
    storing different portions of each version of the software program in a base-exception hierarchy such that (i) basic portions that are common to each version are stored at a first level of the hierarchy, and (ii) exception portions that are common to less than all versions are logically coupled to affected basic portions and stored at succeeding levels of the hierarchy in order of decreasing commonality, said exception portions taking precedence over said basic portions by at least one of supplementing, replacing or modifying said basic portions; and
    upon user command, forming a desired version of the software program by selecting basic portions and exception portions from the different levels of the hierarchy in response to the user command.

12. The method as claimed in claim 11 further comprising storing date indicators for the exception portions and being responsive to the effective date indicators in the step of forming the desired version.

13. The method as claimed in claim 11 wherein the step of storing utilizes object oriented programming techniques to represent the basic portions and the exception portions such that inheritance applies across different portions.

14. The method of claim 11 wherein the software program is for prospecting insurance policies in different lines of business and different jurisdictions, the method enabling a different version for different lines of business and different jurisdictions.

15. The method of claim 14 wherein the first level of the hierarchy corresponds to insurance terms that are acceptable countrywide.

16. The method of claim 15 wherein succeeding levels of the hierarchy correspond to insurance terms according to at least one of different industry standards bureaus, states and insurance companies.

17. The method of claim 14 wherein for the desired version, the step of forming further outputs rating engine files for use as input to a rating engine.

18. The method of claim 17 wherein the rating engine files include at least one of rate tables and rules files.

19. The method of claim 11 wherein, for the desired version, the step of forming includes outputting (a) a user interface, (b) an application database storing data for the desired version, (c) a rules file, and (d) a mapping file describing structure of the application database.

20. The method of claim 19 wherein the step of forming further outputs a program file enabling importing and/or exporting of the desired version over a global network.

\* \* \* \* \*

UNITED STATES PATENT AND TRADEMARK OFFICE
CERTIFICATE OF CORRECTION

PATENT NO. : 7,322,030 B1
APPLICATION NO. : 10/457824
DATED : January 22, 2008
INVENTOR(S) : Boodro et al.

It is certified that error appears in the above-identified patent and that said Letters Patent is hereby corrected as shown below:

In Column 17, Line 5
Delete "RPM" and replace with --IRPM--

In Column 19, Line 31
Delete "l/homeowners" and replace with --1/homeowners--

Signed and Sealed this

Thirty-first Day of March, 2009

JOHN DOLL
*Acting Director of the United States Patent and Trademark Office*